May 15, 1956  H. J. ATKINSON  2,745,550
LIQUID TREATMENT APPARATUS
Filed April 15, 1953
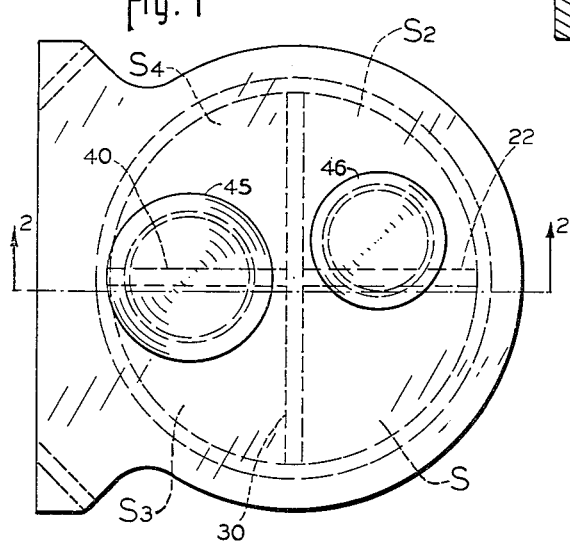
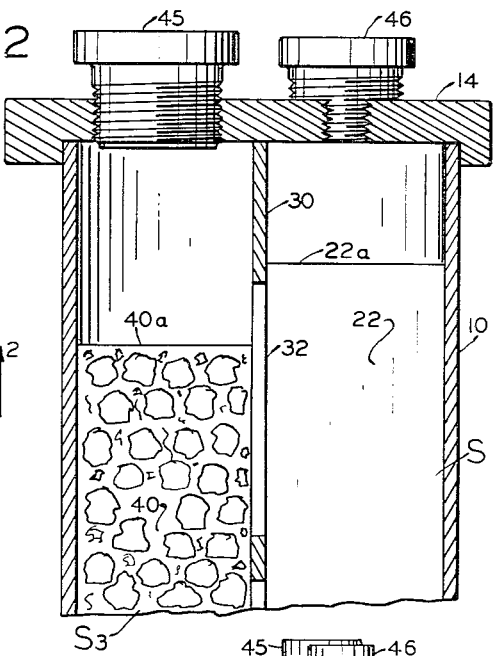
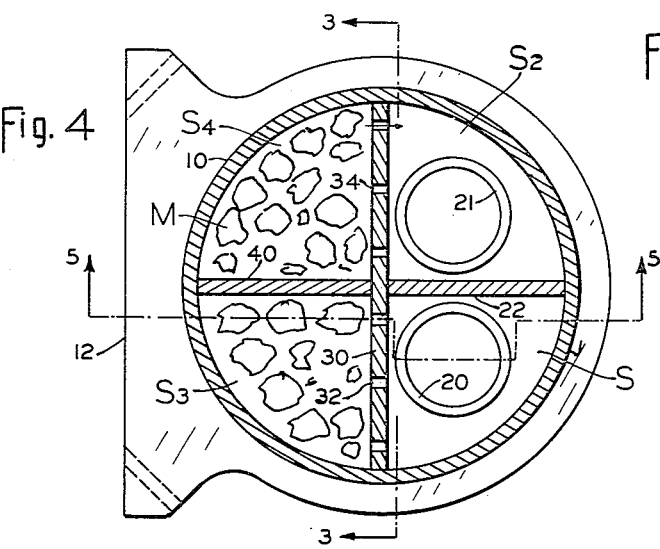
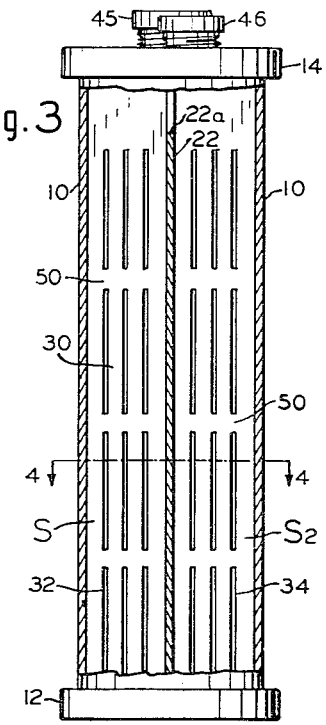
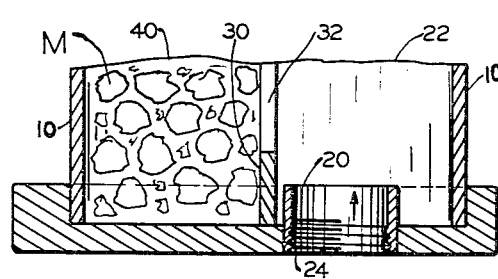
INVENTOR.
HERBERT J. ATKINSON.
BY Chas. T. Hawley
ATT'Y.

United States Patent Office 2,745,550
Patented May 15, 1956

2,745,550

LIQUID TREATMENT APPARATUS

Herbert J. Atkinson, Sudbury, Mass.

Application April 15, 1953, Serial No. 349,024

2 Claims. (Cl. 210—36)

This invention relates to apparatus for treatment of water or other liquids by dissolving a crystalline substance therein. The apparatus is capable of general application but is particularly designed for the treatment of boiler feed water by exposure of the water to a mass of sodium silicate crystals. These crystals dissolve relatively slowly and provide a solution which affords protection for internal surfaces of pipes, tanks and boilers when mixed with the feed water supply.

It is the general object of my present invention to provide improved apparatus for the defined purpose, in which alternate paths of flow are made available. In normal flow, the liquid passes through a portion of a slotted partition member to a storage space containing a mass of crystals, and thereafter reaches a discharge outlet by passing through a second portion of said slotted partition member.

If, however, the slots in the partition member become clogged, the liquid can pass direct to the discharge outlet without entering the storage space, but preferably only after extended flow in contact with the adjacent surfaces of the slotted partition member.

The invention further relates to arrangements and combinations of parts which will be hereinafter described and more particularly pointed out in the appended claims.

A preferred form of the invention is shown in the drawings, in which:

Fig. 1 is a plan view of my improved liquid treatment apparatus;

Fig. 2 is a sectional side elevation of the upper part of the apparatus, taken along the line 2—2 in Fig. 1;

Fig. 3 is a front elevation of the apparatus, partly in section, along the line 3—3 in Fig. 4;

Fig. 4 is a sectional plan view, taken along the line 4—4 in Fig. 3; and

Fig. 5 is a sectional side elevation of a lower portion of the apparatus, taken along the irregular line 5—5 in Fig. 4.

Referring to the drawings, my improved apparatus comprises an elongated cylindrical casing 10 having its lower end seated in a recessed base 12 and having its upper end abutting a recessed cap 14. An inlet tube 20 (Fig. 5) and an outlet tube 21 (Fig. 4) extend through the base 12 on each side of a partition 22, and these tubes 20 and 21 are threaded at their lower ends as indicated at 24 to receive desired pipe connections.

An upright diametrical transverse partition 30 extends from the bottom to the top of the cylinder 10 and is seated on the base 12. This partition is provided with several series of vertical slots 32 in its left-hand part as viewed in Fig. 3, and with corresponding slots 34 in its right-hand part.

The partition member 22 is seated on the base 12 at its lower end but its upper edge 22a (Fig. 2) is spaced downward from the cap 14. The partitions 22 and 30 define clear spaces S and S2 in front of the partition 30.

A similar partition 40 divides the storage space at the rear of the partition 30 into separate compartments S3 and S4. This partition 40 is also seated on the base 12 at its lower end but has its upper edge 40a positioned at a substantially lower level than the upper edge 22a of the front partition 22. The partitions 22 and 40 are imperforate.

A filler plug 45 is provided in the cap 14 so that the storage space S3 and S4 may be conveniently filled with the crystals to be dissolved. A second plug 46 is provided in the cap 14 and in front of the partition 30 for use in cleaning the apparatus.

The slots 32 and 34 are preferably formed by gangs of narrow slitting saws, and for purpose of strength the slots are formed in superposed series of slots, separated by non-slotted portions 50.

Assuming that the tube 20 is the intake and the tube 21 is the outlet, the apparatus functions as follows:

The storage spaces S3 and S4 are first filled with crystals of the treatment material M, commonly sodium silicate. As the water rises in the space S in front of the partition 30, it flows through the slots 32 into the space S3 filled with crystals and it gradually rises in this space S3 until it reaches the top edge 40a of the partition 40.

It then flows over the edge 40a and descends through the crystals in the space S4 and also gradually escapes through the slots 34 to the space S2 having the outlet tube or connection 21 at its lower end. A considerable portion of the liquid thus comes in contact with the crystals in the storage spaces S3 and S4 and this liquid flows upward on one side of the partition 40 and downward on the other side, thus receiving double exposure. In this way, a sufficient amount of the sodium silicate or other crystals is dissolved to afford the desired protection to pipes or boilers.

Long continued operation of the apparatus may cause the slots 32 and 34 to become clogged with dirt or with softened crystallized material, and may thus prevent the liquid from following the above-described path.

In this event, the liquid will rise through the space S until it reaches the top edge 22a of the partition 22. It will then flow over the top edge of the partition into the space S2 and will flow downward through this space to the outlet connection 21. An alternative and non-clogging path of travel is thus provided. The upward travel of the liquid along the front side of the partition 30 exposes the liquid to a reduced extent to the crystallized storage material by leakage through any slots 32 or 34 which may be partially open.

I have thus provided liquid treatment apparatus which in normal operation dissolves sufficient crystallized material M to afford the desired protection to internal surfaces, and I have also provided apparatus which will continue to furnish unobstructed flow of feed water, although less effectively treated, in the event that the partition member 30 becomes clogged.

Having thus described my invention and the advantages thereof, I do not wish to be limited to the details herein disclosed, otherwise than as set forth in the claims, but what I claim is:

1. In liquid treatment apparatus having means to store a mass of crystalline treatment material, means to normally conduct a flow of feed water through said material, and a normally inactive but always freely open by-pass connection through which said feed water may flow directly and with negligible rise in pressure if said conducting means becomes clogged, that improvement which comprises an upright cylinder having a base and a cap and enclosing a vertical transverse and substantially diametral partition which defines a clear space and a storage space for said liquid-treatment material, said diametral partition being secured to said base and extending substantially to said cap and having a multiplicity of normally open and vertically-extended narrow slots, and a first vertical radial and imperforate upright partition having one upright edge fixed to said slotted diametral partition and substantially bisecting the clear space between said diametral partition and that adjacent side wall portion of said cylinder which is more remote from said storage space, and said first radial partition extending from said base to a point spaced downward from said cap and from the top of said slotted diametral partition, and a second vertical radial and imperforate upright partition substantially bisecting said storage space and having one upright edge fixed to said slotted diametral partition, and said second radial partition extending from the base to a point somewhat below the upper end of the first radial partition, and said apparatus having inlet and outlet passages in the lower portion thereof and at opposite sides of said first radial partition and on the same side of said slotted diametral partition, and said passages being connected respectively into the two parts of the vertically extended clear space which is bisected by the first radial partition and which is separated from said storage space by said diametral partition.

2. Liquid treatment apparatus as set forth in claim 1, in which the normally-open and vertically extended narrow slots are disposed in a succession of vertically spaced series, and with each series extending substantially the full width of the vertical diametral partition.

References Cited in the file of this patent

UNITED STATES PATENTS

| | | |
|---|---|---|
| 326,580 | Minor et al. | Sept. 22, 1885 |
| 554,206 | Wiselogel | Feb. 4, 1896 |
| 598,391 | Pooler | Feb. 1, 1898 |
| 842,088 | Elfreth | Jan. 22, 1907 |
| 1,176,126 | Benedict | Mar. 21, 1916 |
| 2,142,947 | Kretzschmar et al. | Jan. 3, 1939 |
| 2,521,802 | Otto | Sept. 12, 1950 |
| 2,649,203 | Hannibal | Aug. 18, 1953 |

FOREIGN PATENTS

| | | |
|---|---|---|
| 288,770 | Great Britain | Apr. 11, 1928 |